Oct. 23, 1923.                                           1,472,007
                        S. JONES
                    TEA AND COFFEE POT
             Filed April 12, 1923      2 Sheets-Sheet 1
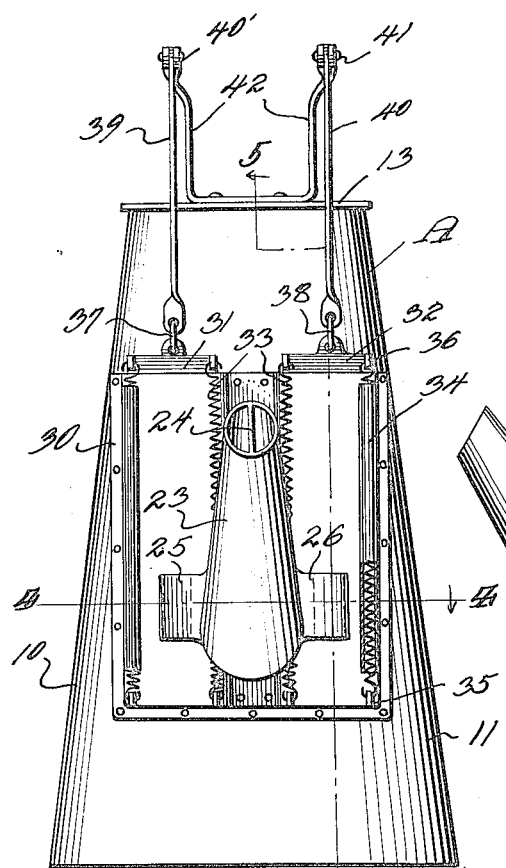
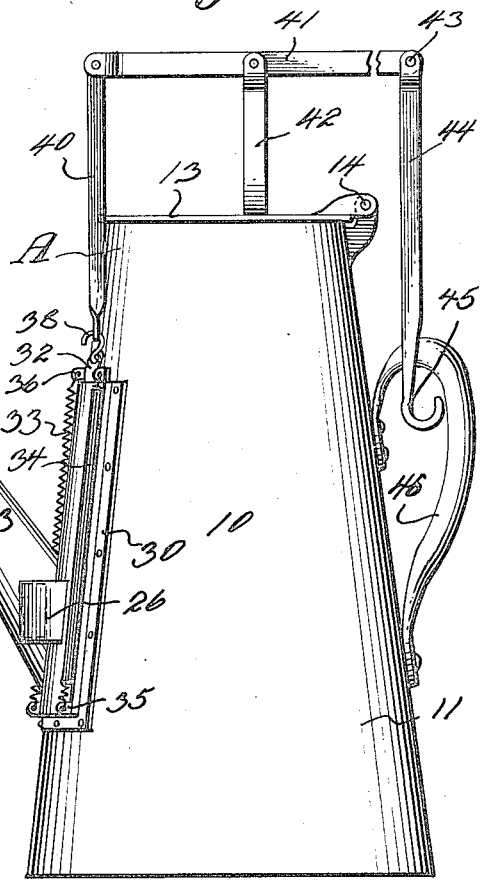
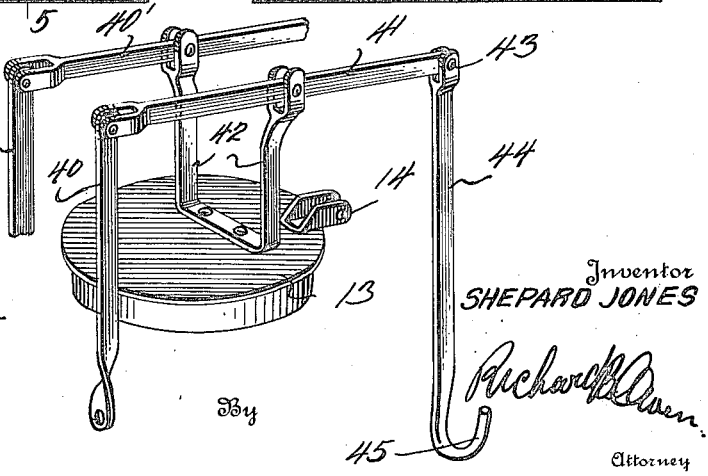
WITNESSES
Inventor
SHEPARD JONES
Attorney

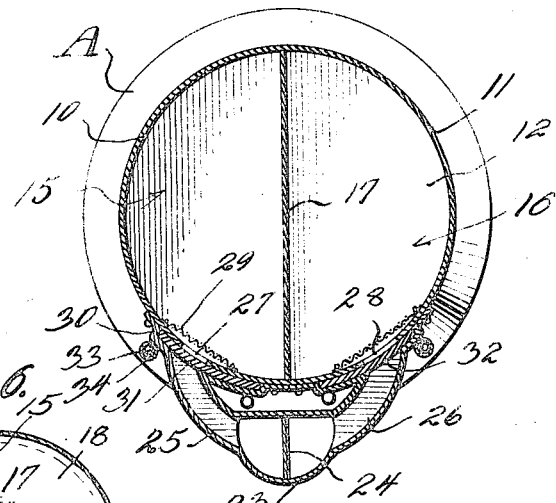
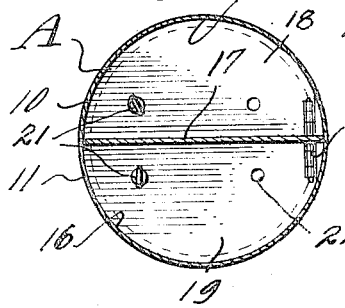
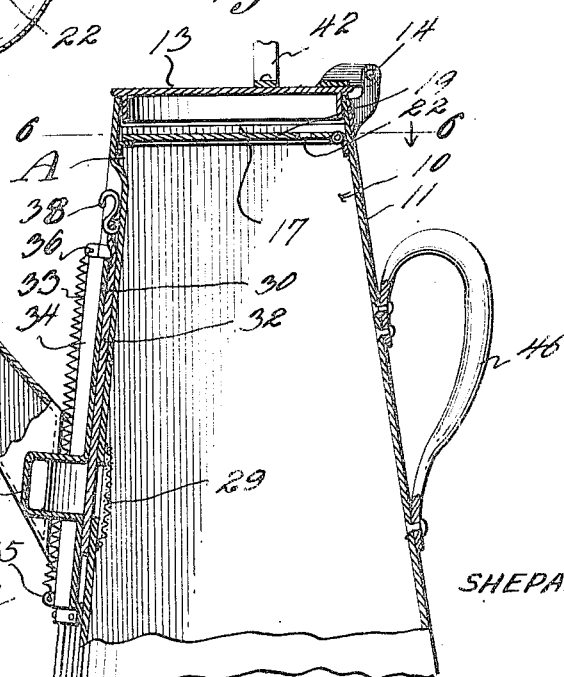

Patented Oct. 23, 1923.

1,472,007

UNITED STATES PATENT OFFICE.

SHEPARD JONES, OF TARENTUM, PENNSYLVANIA.

TEA AND COFFEE POT.

Application filed April 12, 1923. Serial No. 631,663.

*To all whom it may concern:*

Be it known that I, SHEPARD JONES, a citizen of the United States, residing at Tarentum, in the county of Allegheny and State of Pennsylvania, have invented certain new and useful Improvements in Tea and Coffee Pots, of which the following is a specification.

This invention relates to domestic cooking utensils and the primary object of the invention is to provide a single utensil in which both coffee and tea can be cooked or brewed independently of one another.

Another object of the invention is to provide a combined coffee and tea pot, with novel means for permitting either the coffee or the tea to be poured independently from the pot as may be desired.

A further object of the invention is to provide novel means for controlling the flow of the coffee or tea from the pot, and novel means for permitting access to be had to the interior of the said pot when necessary or desirable.

A still further object of the invention is to provide a combined coffee and tea pot of the above character, which will be durable and efficient in use, one that will be simple and easy to manufacture, and one which can be placed on the market at a reasonable cost.

With these and other objects in view the invention consists in the novel construction, arrangement and formation of parts, as will be hereinafter more specifically described, claimed and illustrated in the accompanying drawings, in which drawings:

Figure 1 is a front elevation of the improved domestic cooking utensil.

Figure 2 is a side elevation of the same.

Figure 3 is a detail perspective view of the outer lid or cover of the combined coffee and tea pot showing the manipulating means for the outlet for the coffee and tea carried thereby.

Figure 4 is a horizontal section taken through the improved combined coffee and tea pot taken on the line 4—4 of Figure 1 of the drawings.

Figure 5 is an enlarged fragmentary vertical section through the improved utensil taken on the line 5—4 of Figure 1, and Figure 6 is a detail horizontal section through the improved receptacle taken on the line 6—6 of Figure 5 showing the inner covers associated with said receptacle.

Referring to the drawings in detail, wherein similar reference characters designate corresponding parts throughout the several views the letter A generally indicates the improved combined coffee and tea pot, which includes the body 10, that can be formed of any preferred or desired material, such as copper, aluminum or enameled iron. The body 10 consists of the frusto-conical shaped side wall 11 and the bottom wall 12. The extreme upper edge of this body is adapted to be normally closed by a cover 13 which is preferably secured in place by a suitable hinge 14 to permit the interior of the body to be readily viewed when so desired.

This body 10 is preferably divided into independent compartments 15 and 16 by a diametrically extending partition 17 which can be formed of the same material as the said body. This partition 17 terminates short of the upper end of the body in order to permit the easy insertion of the lid 14 into the said body.

Auxiliary lids 18 and 19 are provided for the body and it can be seen that each compartment is provided with individual lids and these lids 18 and 19 can be hingedly secured in position as indicated by the reference character 20 and provided with suitable manipulating handles 21. Suitable openings 22 can be provided in these inner lids 18 and 19 to permit the escape of steam from the compartments 15 and 16.

The body 10 at a point equidistant its ends is provided with an upwardly and outwardly inclined delivery spout 23 which is also divided longitudinally by a central partition 24. The central partition 24 of course divides the spout into independent compartments for permitting the contents of either one of the compartments 18 and 19 to be independently of each other and these compartments 15 and 16 have communication with the passageways of the spout 23 formed by the partition 24 by curved arcuate connecting passageways 25 and 26 which communicate with openings 27 and 28 formed in the said body 10. These openings 27 and 28 are covered by a suitable foraminous material 29 which forms a strainer for the material being poured from the said chamber.

On each side of the spout 23 is disposed a guideway 30 and these guideways 30 receive slide plates or valves 31 and 32. These slide valves 31 and 32 extend transversely across the passageways 25 and 26 and serve as means for controlling the flow of liquid therethrough. Each slide valve 31 is controlled by a pair of contractile coil springs 33 and if so desired suitable guides 34 can be provided for these end coil springs. The lower terminals of these springs 33 are hooked to suitable lugs 35 secured to the extreme lower ends of the guides 30, while the upper ends thereof are hooked to lugs 36 formed on the said slide valves 31 and 32. The slide valves 31 and 32 carry pivoted hooks 37 and 38 which are adapted to detachably hook in depending links 39 and 40 which are in turn pivotally connected to operating levers 40 and 41. The operating levers 40' and 41 are pivotally secured intermediate their ends upon suitable upstanding supports 42 which are riveted to the upper surface of the lid 13. The rear ends of the operating levers 40' and 41 have pivotally secured thereto as at 43 depending operating arms 44 which terminate in hooks 45 and adjacent to the handle 46 of the body 10.

It is obvious that by manipulating either one of the operating arms 44 that either one of the slide valves 31 and 32 can be manipulated for permitting the contents of one of the compartments to be poured out from the body.

When it is desired to open the lid 13, it is merely necessary to unhook the hooks 37 and 38 from engagement with the links 39 and 40 after which the lid 13 can be readily raised.

If it is desired to only cook one thing at a time in the pot, the compartment not being used can be partly filled with water in order to prevent the burning of the pot.

From the foregoing description it can be seen that an improved and simple domestic cooking utensil has been provided in which both coffee and tea can be brewed simultaneously and which can be poured out therefrom independently of each other.

Changes in details may be made without departing from the spirit or the scope of this invention.

What I claim as new is:—

1. A coffee and tea pot comprising a body, a longitudinally extending partition arranged in the body dividing the same into a pair of independent compartments, a spout for said body, arcuate passageways connecting the compartments with the spout, sliding valves for controlling the flow of liquid through said passageways, and a handle for the body, and means disposed adjacent to said handle for operating said slide valves.

2. A combined coffee and tea pot comprising a body, a partition disposed in said body dividing the same into a pair of independent compartments, a spout for the body, passageways connecting the spout with the compartments, an independent control slide valve for each passageway, a handle for the body, levers pivotally secured intermediate their ends carried by the body, depending links secured to the forward ends of said levers and connected to said slide valves, and operating arms pivotally secured to the rear ends of said levers and terminating adjacent to said handle.

3. A combined coffee and tea pot comprising a body divided centrally to form a pair of independent compartments, a pivoted cover carried by the body, a handle carried by the body, a single spout carried by the body divided centrally to define a pair of passageways, arcuate connecting passageways communicating with the passageways of the spout and with said compartments, a sliding control valve for each connecting passageway, spring means normally holding the slide valves in a closed position, brackets carried by the cover, levers pivotally secured intermediate their ends to the brackets, depending links pivotally secured to the forward ends of the levers, means detachably connecting the lower ends of the links with the slide valves, depending arms pivotally connected to the rear ends of said levers, and hooked handles formed on said arms disposed adjacent to the handle of said body.

In testimony whereof I affix my signature in presence of two witnesses.

SHEPARD JONES.

Witnesses:
 FRANK C. STEWART,
 D. E. DERINGER.